United States Patent
Buzzard et al.

(10) Patent No.: US 10,534,340 B2
(45) Date of Patent: Jan. 14, 2020

(54) MODULAR GENERATOR CONTROL AND EXTERNAL POWER UNIT

(71) Applicant: Hamilton Sundstrand Corporation, Charlotte, NC (US)

(72) Inventors: John N. Buzzard, Rockford, IL (US); Richard T. Wetzel, Davis Junction, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 826 days.

(21) Appl. No.: 14/713,856

(22) Filed: May 15, 2015

(65) Prior Publication Data

US 2016/0334769 A1    Nov. 17, 2016

(51) Int. Cl.
| | |
|---|---|
| *G05B 19/048* | (2006.01) |
| *H02J 3/00* | (2006.01) |
| *H02J 3/04* | (2006.01) |
| *H02J 9/06* | (2006.01) |
| *H02P 9/48* | (2006.01) |

(52) U.S. Cl.
CPC ............ *G05B 19/048* (2013.01); *H02J 3/005* (2013.01); *H02J 3/04* (2013.01); *H02J 9/066* (2013.01); *G05B 2219/2639* (2013.01); *H02P 9/48* (2013.01)

(58) Field of Classification Search
CPC .................. H02J 3/005; G05B 19/048; G05B 2219/2639
See application file for complete search history.

(56) References Cited

U.S. PATENT DOCUMENTS

| | | | |
|---|---|---|---|
| 4,403,292 A | 9/1983 | Ejzak et al. | |
| 5,272,387 A | 12/1993 | Fiorina | |
| 5,355,024 A | 10/1994 | Elliott | |
| 8,295,950 B1 | 10/2012 | Wordsworth | |
| 2001/0017485 A1* | 8/2001 | Yoo | H02J 3/005 307/66 |
| 2002/0074863 A1 | 6/2002 | Turvey | |
| 2004/0172204 A1* | 9/2004 | Eaton | H02J 3/005 702/57 |

(Continued)

FOREIGN PATENT DOCUMENTS

| | | |
|---|---|---|
| EP | 2615469 | 7/2013 |
| WO | 2010002644 | 1/2010 |

OTHER PUBLICATIONS

Extended European Search Report for EP Application No. 16169898.0-1806, dated Sep. 30, 2016, pp. 1-12.

*Primary Examiner* — Mohammad Ali
*Assistant Examiner* — Vincent W Chang
(74) *Attorney, Agent, or Firm* — Cantor Colburn LLP

(57) ABSTRACT

A method and system for use with an electric power system includes a monitoring unit to monitor at least one power characteristic, a generator control unit to control at least one generator characteristic, a ground interface unit to receive a ground power input, and a device configuration interface to select at least one of a generator control mode and an external power monitor mode, wherein the device configuration interface selectively engages at least one of the monitoring unit, the generator control unit, and the ground interface unit in response to at least one of the generator control mode and the external power monitor mode.

17 Claims, 4 Drawing Sheets

(56) References Cited

U.S. PATENT DOCUMENTS

| | | | |
|---|---|---|---|
| 2005/0128659 A1* | 6/2005 | Hibi | H02J 3/005 361/20 |
| 2007/0069579 A1* | 3/2007 | Bailey | B60L 11/1816 307/10.1 |
| 2010/0049455 A1* | 2/2010 | Scholtz | H02P 9/105 702/60 |
| 2010/0231042 A1 | 9/2010 | Weale | |
| 2011/0246686 A1* | 10/2011 | Cavanagh, Jr. | G06F 13/28 710/22 |
| 2012/0309214 A1 | 12/2012 | Beluse | |
| 2013/0181698 A1 | 7/2013 | Rutheiser | |
| 2013/0270918 A1 | 10/2013 | Novakovic | |
| 2013/0328389 A1* | 12/2013 | Ayana | H02J 3/005 307/9.1 |
| 2014/0054957 A1 | 2/2014 | Bellis | |
| 2014/0210399 A1 | 7/2014 | Urschel | |
| 2015/0070950 A1* | 3/2015 | Myhre | H02M 1/32 363/53 |

\* cited by examiner

MODULAR GENERATOR CONTROL AND EXTERNAL POWER UNIT

BACKGROUND

The subject matter disclosed herein relates to modular generator control and external power units, and to a system and a method for providing a common unit for providing generator control and external power control for an aircraft.

Typically, an aircraft electric power system includes generator control units and external power monitors to control power from main engine generators, an auxiliary generator, and external power sources. Advantageously, generator control units and external power monitors control power to the airplane and provide protection for the airplane in the event of faults in the supplied power.

Multiple generator control units and external power monitors are utilized in an aircraft electric power system to provide and control power to the aircraft. Current generator control units and external power monitors each require unique designs for their respective configuration and task, requiring significant development costs, qualification testing and software verification. A system and method for a common unit for both generator control and external power monitoring is desired.

BRIEF SUMMARY

According to an embodiment, a multifunction control system for use with an electric power system includes a monitoring unit to monitor at least one power characteristic, a generator control unit to control at least one generator characteristic, a ground interface unit to receive a ground power input, and a device configuration interface to select at least one of a generator control mode and an external power monitor mode, wherein the device configuration interface selectively engages at least one of the monitoring unit, the generator control unit, and the ground interface unit in response to at least one of the generator control mode and the external power monitor mode.

According to an embodiment, a method for controlling an electric power system includes selecting at least one of a generator control mode and an external power monitor mode via a device configuration interface, selectively engaging a monitoring unit in response to at least one of the generator control mode and the external power monitor mode, monitoring at least one power characteristic via the monitoring unit, selectively engaging a generator control unit in response to the generator control mode, controlling at least one generator characteristic via the generator control unit, selectively engaging a ground interface unit in response to the external power monitor mode, and receiving a ground power input via the ground interface unit.

Technical function of the embodiments described above includes a monitoring unit to monitor at least one power characteristic, a generator control unit to control at least one generator characteristic, a ground interface unit to receive a ground power input, and a device configuration interface to select at least one of a generator control mode and an external power monitor mode, wherein the device configuration interface selectively engages at least one of the monitoring unit, the generator control unit, and the ground interface unit in response to at least one of the generator control mode and the external power monitor mode.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
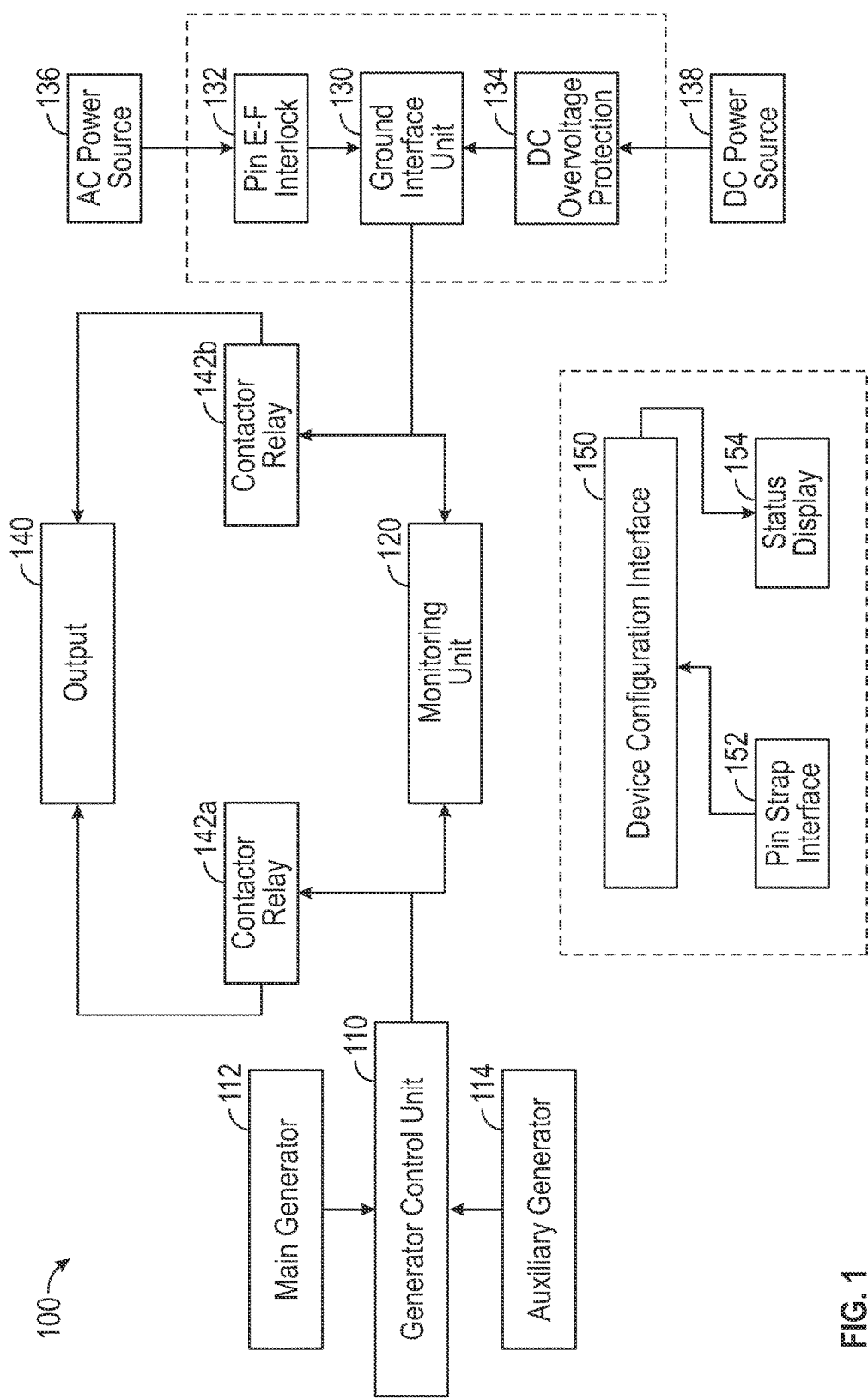
FIG. 1 illustrates a schematic view of one embodiment of a multifunction control system.

Referring now to the drawings, FIG. 1 illustrates a schematic view of an embodiment of a multifunction control system 100. In the illustrated embodiment, multifunction control system 100 includes generator control unit 110, monitoring unit 120, ground interface unit 130, output 140, and device configuration interface 150. Multifunction control system 100 may contain hardware and software to selectively perform the functions of a conventional generator control unit (main generator control and auxiliary generator control) and an external power monitor. In one embodiment, multifunction control system 100 can operate in a generator control mode, wherein multifunction control system 100 can control and monitor a main generator 112 or an auxiliary generator 114. In one embodiment, multifunction control system can operate in an external power monitor mode, wherein multifunction control system 100 can control and monitor external AC power source 136, or DC power source 138.

In one embodiment, generator control unit 110 can control a main generator 112 or an auxiliary generator 114. Generator control unit 110 can include hardware and software necessary to control main generator 112 or auxiliary generator 114. In one embodiment, generator control unit 110 includes functionality to provide field current to excite the main generator 112 or auxiliary generator 114. Generator control unit 110 can control the supplied field current to control the operation and output of associated main generator 112 or auxiliary generator 114.

In one embodiment, ground interface unit 130 can be used to control power from external sources and supply external power to the aircraft. In one embodiment, ground interface unit 130 can receive external or ground power from AC power sources 136 or DC power sources 138. In one embodiment, ground interface unit 130 can utilize hardware and software to analyze and monitor power from external power sources 136,138 to ensure suitable power for use with an aircraft. In certain embodiments, ground interface unit 130 can control and send AC power from an AC power source 136 to an aircraft. In certain embodiments, ground interface unit 130 can include a Pin E-F interlock 132 to allow safe engagement of AC power source 136 to ground interface unit 130. In certain embodiments, Pin E-F interlock 132 is integrated with ground interface unit 130, while in other embodiments, Pin E-F interlock 132 is a separate component. In one embodiment, the ground interface unit 130 contains AC voltage and frequency protection functions in addition to the pin E-F interlock function.

In certain embodiments, ground control unit 130 can control and send DC power from a DC power source 138 to an aircraft. In certain embodiments, ground control interface 130 can include a DC overvoltage protection 134 to prevent DC overvoltage from damaging ground interface unit 130 and power systems of an airplane. In certain embodiments, DC overvoltage protection 134 is integrated with ground interface unit 130, while in other embodiments, DC overvoltage protection 134 is a separate component.

In one embodiment, monitoring unit 120 is utilized to monitor the quality of power received from either main generator 112 via generator control unit 110, auxiliary generator 114 via generator control unit 110, AC power source 136 via ground interface unit 130, or DC power source 138 via ground interface unit 130. In one embodiment, monitoring unit 120 can monitor power received before power is sent to an aircraft via output 140. Monitoring unit 120 can include software and hardware to monitor the quality of the power output by measuring parameters including, but not limited to voltage, amperage, frequency, fluctuations, etc.

In one embodiment, output 140 provides an output from one or more of from generator control unit 110, monitoring unit 120, and/or ground unit interface 130. In certain embodiments, output 140 can receive power from generator control unit 110 and/or ground interface unit 130 and provide a unified output to an aircraft. In certain embodiments, output 140 can include a discrete output dependent on the selected functionality as a generator control unit or an external power monitor unit. In certain embodiments, output 140 can include a common output independent of a selected mode of multifunction system 100. In certain embodiments, output 140 can include contactor relay control 142a, 142b. In certain embodiments, contactor relay 142a control can be associated with the generator control unit 110 or contactor relay 142b control can be associated with a ground interface unit 130. In certain embodiments, contactor relay control 142a, 142b can be a single common contactor relay control when utilized as a common output. In certain embodiments, contactor relay control 142a,142b can be integrated with output 140 as a single component. In other embodiments, contactor relay controls 142a, 142b are one or two separate components.

In one embodiment, device configuration interface 150 allows multifunction control system 100 to operate in a generator control mode or an external power monitor mode. As previously described, multifunction control system 100 may include a super set of units 110, 120, 130 that allow functionality as both a conventional generator control unit or an external power monitor.

In one embodiment, device configuration interface 150 can select between generator control mode and external power monitor mode. In one embodiment, a pin strap interface 152 can be utilized to select an appropriate mode. In other embodiments, device configuration interface 150 can automatically sense multifunction control system 100 system locations and desired configurations. In other embodiments, device configuration interface 150 can accept a manual input to determine a generator control mode or an external power monitor mode. In certain embodiments, device configuration interface 150 can further identify main generator control mode functionality or auxiliary generator control mode functional contingent on connections or associations with main generator 112 or auxiliary generator 114.

In certain embodiments, current status and configuration of device configuration interface 150 and multifunction control system 100 can be shown on status display 154. In certain embodiments, a current multifunction control system 100 mode can be shown.

Figure 2:
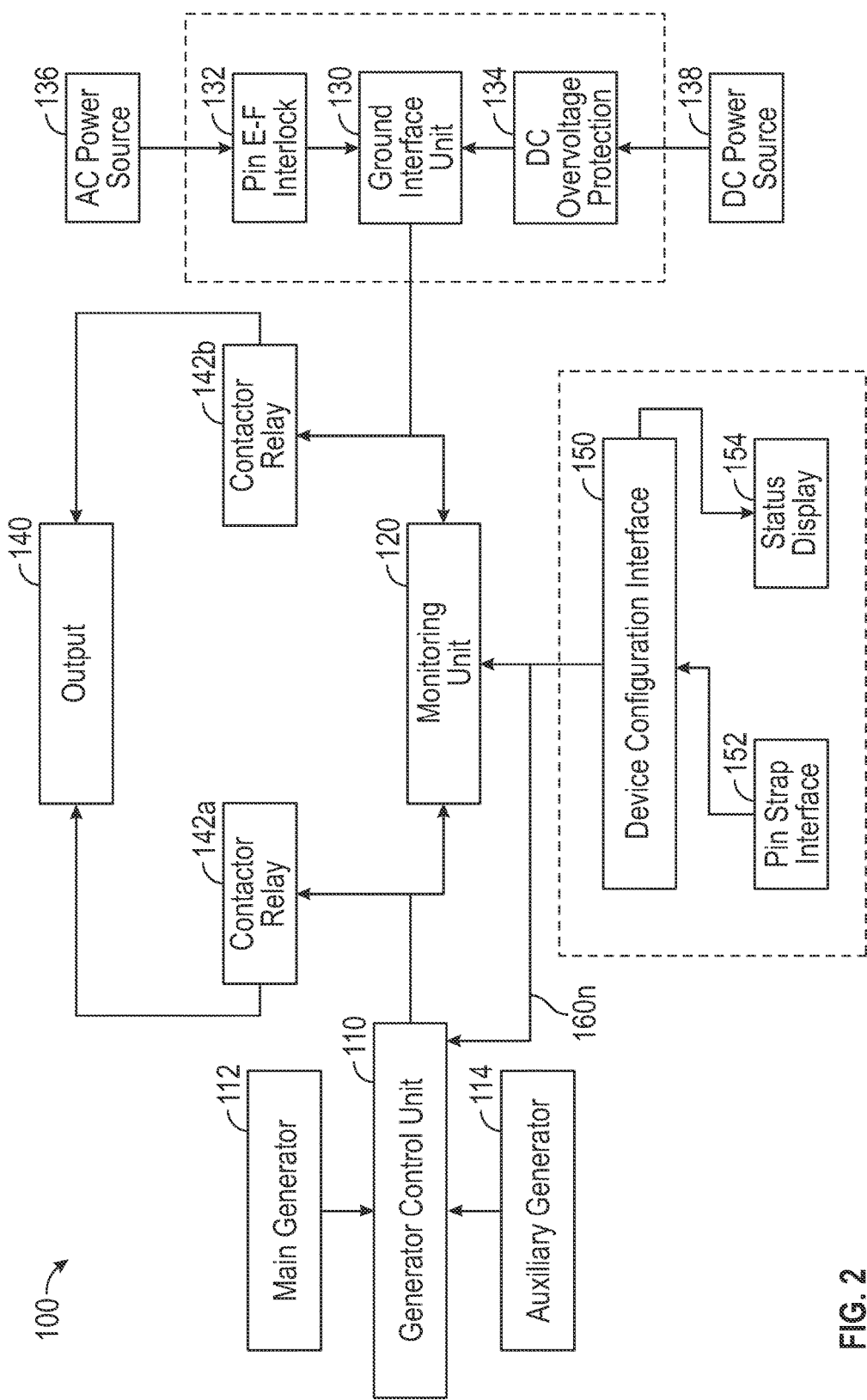
FIG. 2 illustrates the multifunction control system of FIG. 1 in a generator control mode.

Referring to FIG. 2, device configuration interface 150 can operate in a generator control mode 160a. In one embodiment, device configuration interface 150 engages generator control unit 110 and monitoring unit 120, wherein engagement is schematically shown as generator control mode 160a. In certain embodiments, generator control mode 160a can engage generator control unit 110 without engaging monitoring unit 120.

Figure 3:
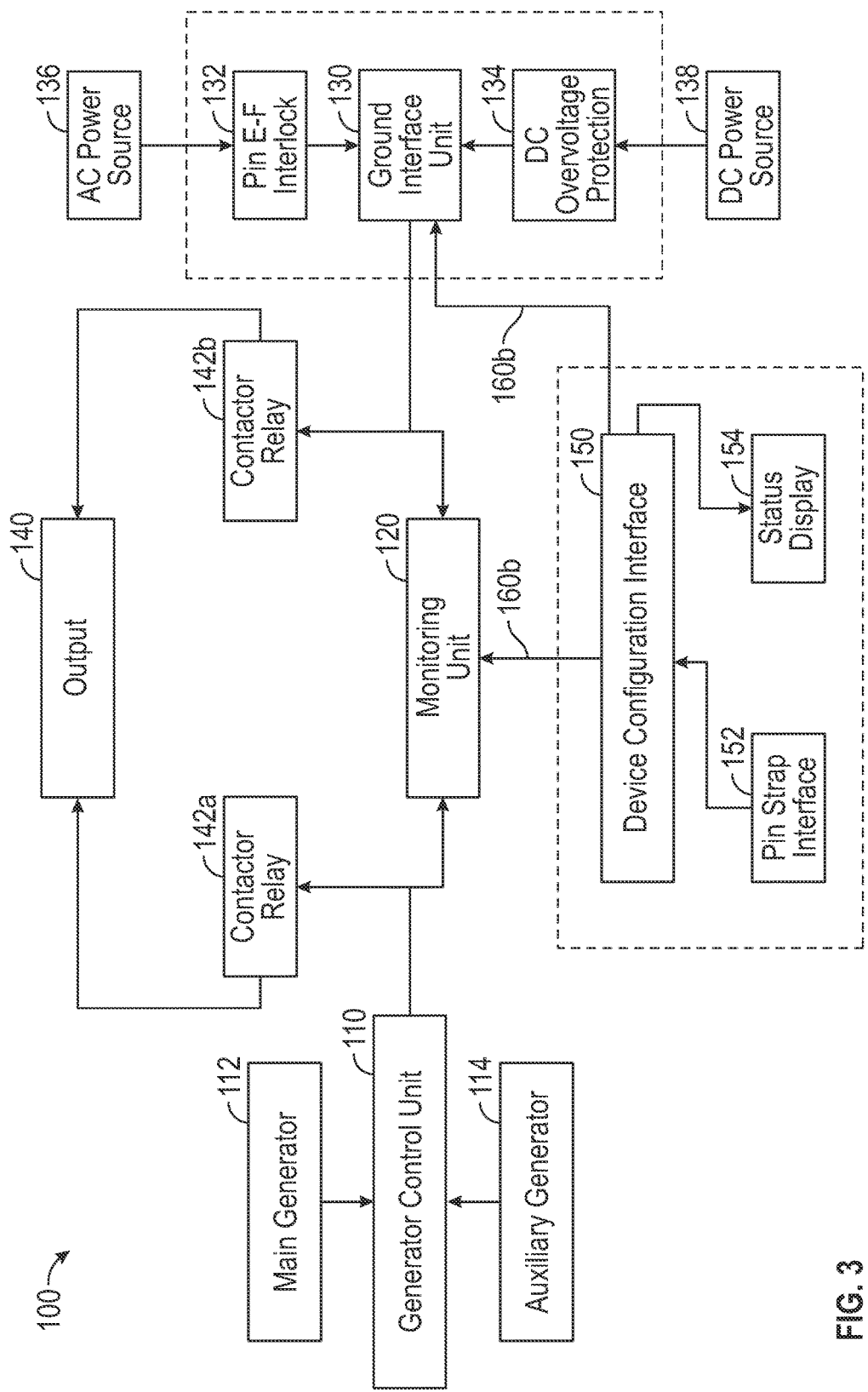
FIG. 3 illustrates the multifunction control system of FIG. 1 in an external power monitor mode.

Referring to FIG. 3, device configuration interface 150 can operate in an external power mode 160b. In one embodiment, device configuration interface 150 engages ground interface unit 130 and monitoring unit 120, wherein engagement is schematically shown as external power mode 160b. In certain embodiments, external power mode 160b can engage ground interface unit 130 without engaging monitoring unit 120 or engaging generator control unit 110.

Advantageously, the use of multifunction control system 100 allows for replacement of discrete main generator control units, auxiliary generator control units, and external power monitors with the same multifunction part. The use of a common multifunction control system 100 allows for lower development costs (including qualification testing, software verification, and design) compared to discrete generator control units and external power monitors. Further, a single multifunction control system 100 allows maintenance to be streamlined and reduces replacement inventory requirements.

Figure 4:
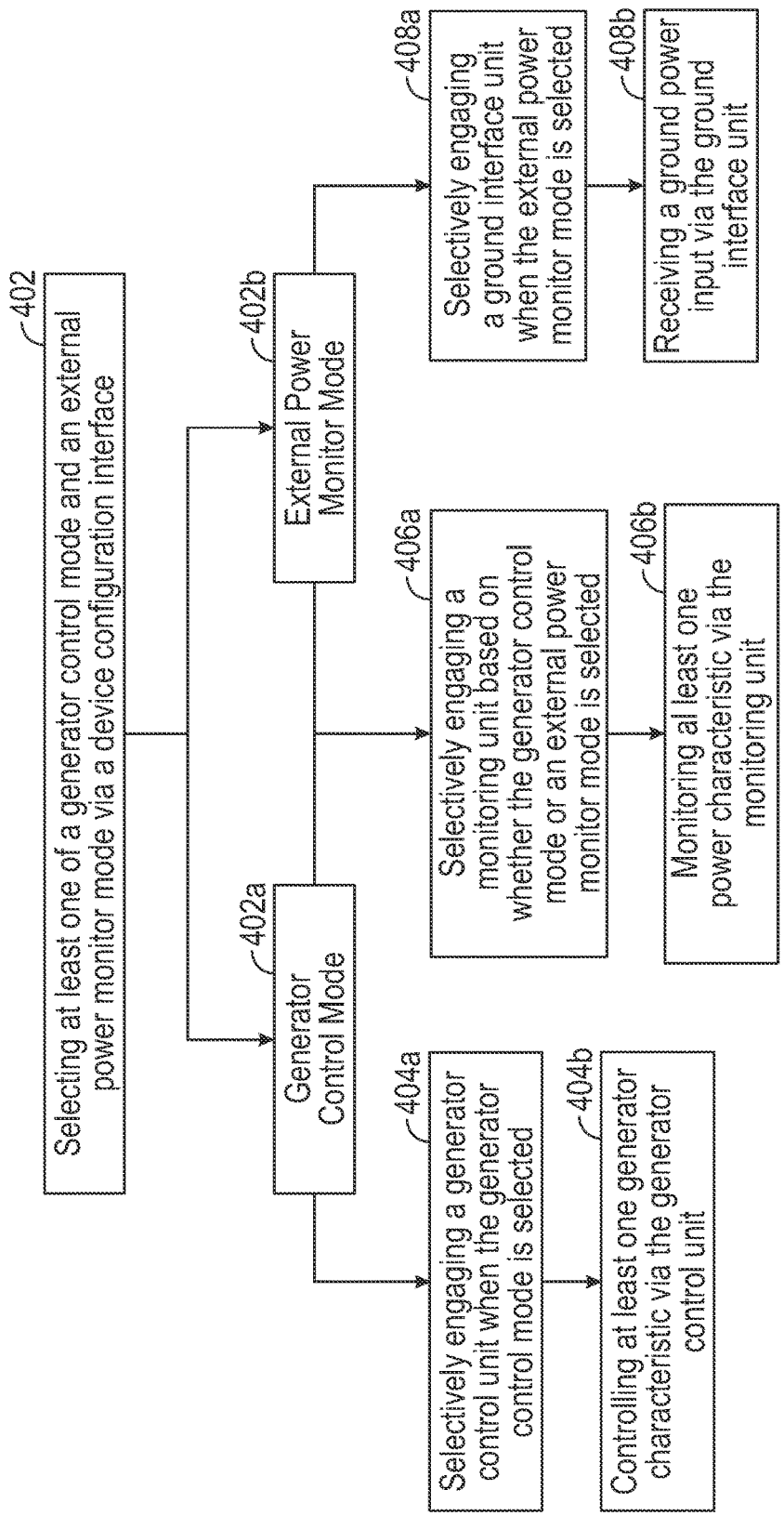
FIG. 4 is a flowchart illustrating a method of controlling an electric power system.

Referring to FIG. 4, a method 400 for controlling an electric power system is illustrated. In one embodiment, method 400 can utilize a system similar to the multifunction control system 100 previously described.

In operation 402, a generator control mode 402a or an external power monitor mode 402b is selected. In one embodiment, a mode selection can be made by a device configuration interface. In certain embodiments, the mode selection can be automatic, manual, or selected via an interface, such as a pin strap interface.

In response to a selection of generator control mode 402a, in operation 404a, a generator control unit is selectively engaged. In one embodiment, a generator control unit can control operation and excitation of a generator. In certain embodiments, the generator can be a main generator or an auxiliary generator.

In operation 404b, at least one generator characteristic can be controlled via the generator control unit. In certain embodiments, characteristics can include, but are not limited to, excitation characteristics, output characteristics, control characteristics, etc.

In response to a selection of external power monitor mode 402b, in operation 408a, a ground interface unit is selectively engaged. In one embodiment a ground interface unit can control and receive power from an external power source. In certain embodiments the external power source can be an AC power source or a DC power source.

In operation 408b, external power from a ground source is received. In one embodiment, received power is transmitted to an aircraft.

In one embodiment, in both modes 402a, 402b, a monitoring unit can be selectively engaged. In operation 406a, a monitoring unit is selectively engaged in response to either a generator control mode or an external power monitor mode. In one embodiment, a monitoring unit can monitor certain power characteristics of a power source from either a generator control unit or a external power monitor.

In operation 406b, at least one power characteristic is monitored via the monitoring unit. In one embodiment, power characteristics may include, but are not limited to, voltage, amperage, frequency, fluctuations, etc.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A multifunction control system for use with an electric power system, comprising:
   an output for providing first and second power to an aircraft;
   a monitoring unit disposed in parallel with the output to monitor at least one power characteristic;
   a generator control unit to control at least one generator characteristic and to supply the first power to the monitoring unit and to the output;
   a ground interface unit to receive a ground power input and to supply the second power to the monitoring unit and to the output;
   a device configuration interface to select at least one of a generator control mode and an external power monitor mode, wherein:
   the device configuration interface selectively engages the monitoring unit and the generator control unit when the generator control mode is selected and while the generator control mode remains selected, and
   the device configuration interface selectively engages the monitoring unit and the ground interface unit when the external power monitor mode is selected and while the external power monitor mode remains selected;
   a first contactor relay electrically interposed between the generator control unit and the output to engage the generator control unit when the generator control mode is selected; and
   a second contactor relay electrically interposed between the ground interface unit and the output to engage the ground interface unit when the external power monitor mode is selected, wherein:
   the generator control unit supplies the first power to the output and the monitoring unit via the first contactor relay, and
   the ground interface unit supplies the second power to the output and the monitoring unit via the second contactor relay.

2. The multifunction control system of claim 1, the device configuration interface comprising a pin strap interface to select at least one of the generator control mode and the external power monitor mode.

3. The multifunction control system of claim 1, wherein the at least one generator characteristic includes at least one of a generator excitation characteristic, and a generator control characteristic.

4. The multifunction control system of claim 1, wherein the at least one power characteristic includes an amperage characteristic.

5. The multifunction control system of claim 1, the ground interface unit comprising a pin E-F interlock to selectively receive an AC ground power input.

6. The multifunction control system of claim 1, the ground interface unit comprising a DC overvoltage protection unit to receive the ground power input.

7. The multifunction control system of claim 1, wherein the generator control mode includes at least one of a main generator control mode and an auxiliary generator control mode.

8. The multifunction control system of claim 1, wherein the device configuration interface indicates a system status and a selection of the at least one of the generator control mode and the external power monitor mode.

9. A method for controlling an electric power system, the method comprising:
   providing first and second power to an aircraft from an output;
   disposing a monitoring unit to monitor at least one power characteristic in parallel with the output;
   supplying the first power from a generator control unit to control at least one generator characteristic to the monitoring unit and to the output via a first contactor relay electrically interposed between the generator control unit and the output;
   supply the second power from a ground interface unit to receive a ground power input to the monitoring unit and to the output via a second contactor relay electrically interposed between the ground interface unit and the output;
   selecting at least one of a generator control mode and an external power monitor mode via a device configuration interface;
   selectively engaging the generator control unit to control at least one generator characteristic and the monitoring unit to monitor at least one power characteristic in response to the generator control mode being selected and while the generator control mode remains selected; and
   selectively engaging the ground interface unit to receive a ground power input and the monitoring unit to monitor the at least one power characteristic in response to the external power monitor mode being selected and while the external power monitor mode remains selected.

10. The method of claim 9, wherein the at least one generator characteristic includes at least one of a generator excitation characteristic, and a generator control characteristic.

11. The method of claim 9, wherein the at least one power characteristic includes an amperage characteristic.

12. The method of claim 9, wherein the generator control mode includes at least one of a main generator control mode and an auxiliary generator control mode.

13. A multifunction control system for use with an electric power system, comprising:
   an output for providing first and second power to an aircraft;
   first and second contactor relays respectively disposed upstream from the output;

a monitoring unit disposed in parallel with the output to monitor at least one power characteristic;

a generator control unit to which main and auxiliary generators are coupled to control at least one generator characteristic and to supply the first power to the monitoring unit and to the output via the first contactor relay;

a ground interface unit to receive a ground power input from an alternating current (AC) source and a direct current (DC) source via a pin interlock and a DC overvoltage protection unit, respectively, and to supply the second power to the monitoring unit and to the output via the second contactor relay; and a device configuration interface to select a generator control mode or an external power monitor mode, wherein:

the device configuration interface selectively engages the monitoring unit and the generator control unit when the generator control mode is selected, and the device configuration interface selectively engages the monitoring unit and the ground interface unit when the external power monitor mode is selected.

14. The multifunction control system of claim 13, wherein the at least one generator characteristic includes at least one of a generator excitation characteristic and a generator control characteristic.

15. The multifunction control system of claim 13, wherein the at least one power characteristic includes at least one of a voltage characteristic and an amperage characteristic.

16. The multifunction control system of claim 13, wherein the generator control mode includes at least one of a main generator control mode and an auxiliary generator control mode.

17. The multifunction control system of claim 13, wherein the device configuration interface indicates a system status and a selection of the at least one of the generator control mode and the external power monitor mode.

* * * * *